(12) United States Patent
Dandoko et al.

(10) Patent No.: US 11,782,597 B2
(45) Date of Patent: Oct. 10, 2023

(54) DISPLAY APPARATUS THAT DISPLAYS MENU ITEM INDICATING NAME OF GROUP INCLUDING ITEM TO BE SET DISPLAYED AT UPPERMOST POSITION OF SCROLLABLE DISPLAY REGION, IN DIFFERENT DISPLAY STYLE FROM OTHER MENU ITEMS, AND IMAGE FORMING APPARATUS

(71) Applicant: KYOCERA Document Solutions Inc., Osaka (JP)

(72) Inventors: Takushi Dandoko, Osaka (JP); Ken Saratani, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/505,383

(22) Filed: Oct. 19, 2021

(65) Prior Publication Data

US 2022/0121356 A1    Apr. 21, 2022

(30) Foreign Application Priority Data

Oct. 21, 2020    (JP) ................................ 2020-176674

(51) Int. Cl.
*G06F 3/048*      (2013.01)
*G06F 3/04886*    (2022.01)
(Continued)

(52) U.S. Cl.
CPC ........ *G06F 3/04886* (2013.01); *G06F 3/0482* (2013.01); *G06F 3/0485* (2013.01); *H04N 1/00392* (2013.01); *H04N 1/00501* (2013.01)

(58) Field of Classification Search
CPC .. G06F 3/04886; G06F 3/0482; G06F 3/0485; H04N 1/00392; H04N 1/00501
See application file for complete search history.

(56) References Cited

U.S. PATENT DOCUMENTS 5,781,247 A * 7/1998 Wehmeyer ........... H04N 21/485
                                                   715/810
7,017,122 B1 * 3/2006 Lee ...................... G06F 3/0482
                                                   715/810
(Continued)

FOREIGN PATENT DOCUMENTS

JP    2014-074981 A    4/2014
JP    2014-090248 A    5/2014

*Primary Examiner* — Mahelet Shiberou
(74) *Attorney, Agent, or Firm* — IP BUSINESS SOLUTIONS, LLC

(57) ABSTRACT

A display apparatus includes a touch panel, a display device, and a control device acting as a display controller that causes the display device to display an operation screen, including a scrollable display region for displaying a list of items to be set, in which a plurality of items to be set are classified into groups and listed along a scroll direction, and a menu display region for displaying menu items each indicating a name of the group, to scroll, when a scroll instruction is made on the scrollable display region, the list of items to be set according to the scroll instruction, and to display a first menu item indicating a name of a first group that includes a first item to be set displayed at an uppermost position of the scrollable display region, in a first display style visually different from other menu items.

2 Claims, 21 Drawing Sheets

(51) Int. Cl.
*G06F 3/0485* (2022.01)
*H04N 1/00* (2006.01)
*G06F 3/0482* (2013.01)

(56) References Cited

U.S. PATENT DOCUMENTS

| | | | | |
|---|---|---|---|---|
| 7,587,683 | B2* | 9/2009 | Ito | H04M 1/72469 |
| | | | | 715/857 |
| 8,423,914 | B2* | 4/2013 | Louch | G06F 3/0481 |
| | | | | 715/823 |
| 8,694,917 | B2* | 4/2014 | Yasui | G06F 1/1626 |
| | | | | 715/830 |
| 10,075,645 | B2* | 9/2018 | Tamura | G06F 3/04847 |
| 2005/0235209 | A1* | 10/2005 | Morita | G06F 3/0482 |
| 2008/0120572 | A1* | 5/2008 | Bahn | G06F 3/0482 |
| | | | | 715/810 |
| 2008/0122796 | A1* | 5/2008 | Jobs | H04M 1/72403 |
| | | | | 345/173 |
| 2008/0216005 | A1* | 9/2008 | Bamba | G06F 3/0482 |
| | | | | 715/765 |
| 2011/0022310 | A1* | 1/2011 | Ishii | G06F 3/04886 |
| | | | | 715/781 |
| 2012/0221974 | A1* | 8/2012 | Trotta | G06F 3/0485 |
| | | | | 715/823 |
| 2014/0118782 | A1* | 5/2014 | Tamai | G06F 3/04883 |
| | | | | 358/1.15 |
| 2015/0286357 | A1* | 10/2015 | Penha | G06F 3/04883 |
| | | | | 715/830 |

* cited by examiner

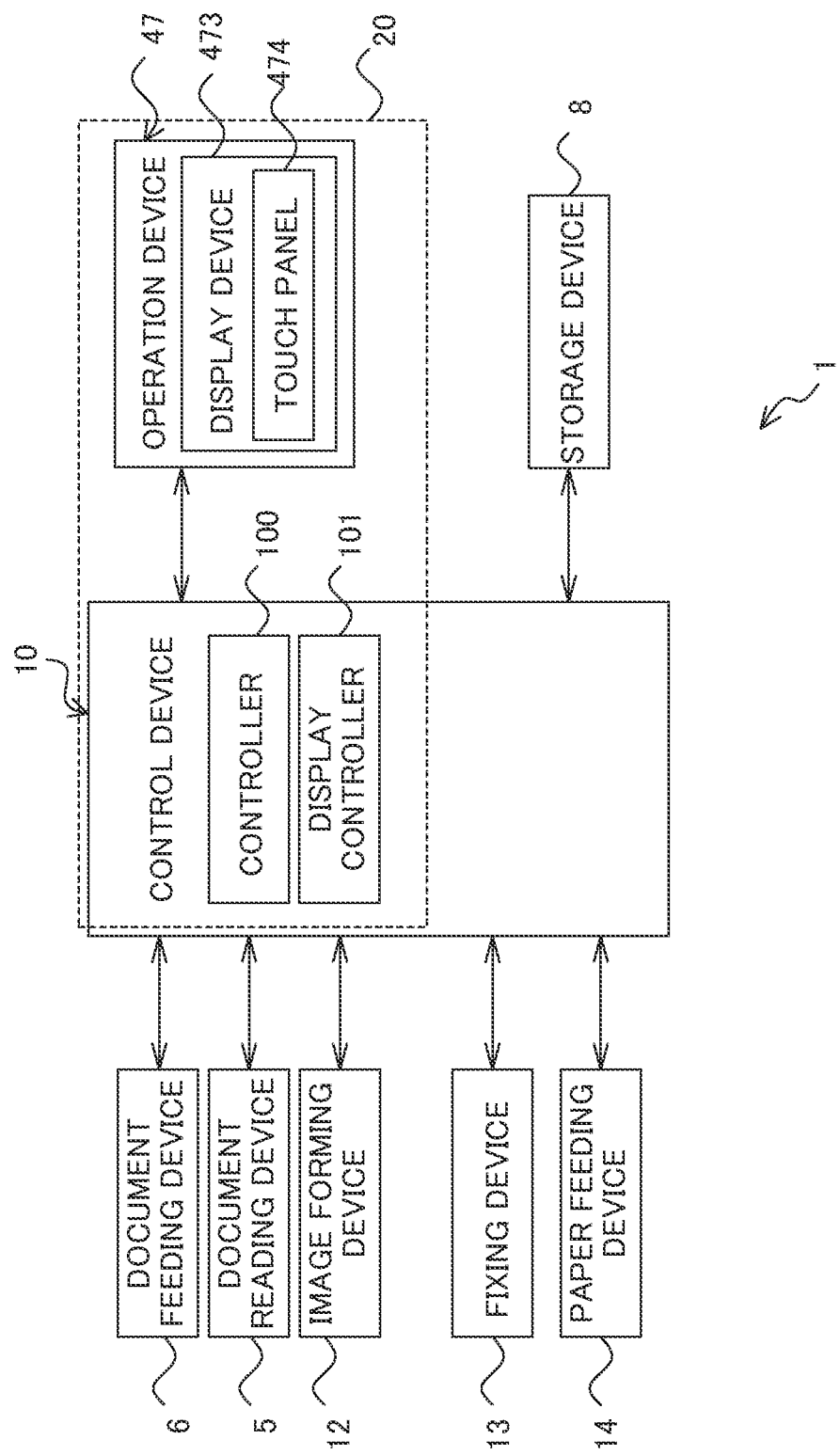

Fig.4

GROUP G1 「QUICK SETUP」
- AUTO PAPER SELECTION — B1
- 100% ZOOM — B2
- B3
- FULL COLOR COLOR SELECTION — B4
- 1-SIDED>> 1-SIDED DUPLEX — B5
- B6
- OFF COMBINE — B7

- ID CARD COPY | COLLATE/OFFSET | ORIGINAL SIZE | MIXED SIZE ORIGINALS — B8, B9

GROUP G2 「ORG./PAPER/FINISHING」
- ORIGINAL SIZE — AUTO > — B10
- PAPER SELECTION — AUTO > — B11
- MIXED SIZE ORIGINALS — OFF > — B12
- ORIGINAL ORIENTATION — TOP EDGE ON TOP > — B13
- COLLATE/OFFSET — COLLATE ON > — B14
- PAPER OUTPUT — INNER TRAY > — B15
- ID CARD COPY — ◯ — B16
- ORG.MANUAL FEED(DP) — ◯ — B17

GROUP G3 「LAYOUT/EDIT」
- ZOOM — 100% > — B18
- COMBINE — OFF > — B19
- MARGIN/CENTERING — OFF > — B20
- BORDER ERASE — STANDARD > — B21
- ERASE SHADOWED AREAS — ◯ — B22
- BOOKLET — OFF > — B23
- DUPLEX — OFF > — B24
- MEMO PAGE — OFF > — B25
- POSTER — OFF > — B26
- INSERT SHEETS/CHAPTERS — OFF > — B27
- IMAGE REPEAT — OFF > — B28
- TEXT STAMP — OFF > — B29
- BATES STAMP — OFF > — B30  L1

GROUP G4 「COLOR/IMAGE QUALITY」
- DENSITY — NORMAL 0 > — B31
- ORIGINAL IMAGE — TEXT+PHOTO(MAGAZINE) > — B32
- COLOR SELECTION — FULL COLOR > — B33
- ECOPRINT — OFF > — B34
- COLOR BALANCE — OFF > — B35
- HUE ADJUSTMENT — OFF > — B36
- ONE-TOUCH IMAGE ADJUST — OFF > — B37
- SHARPNESS — ALL NORMAL 0 > — B38
- BACKGROUND DENSITY ADJ. — OFF > — B39
- SATURATION — 0 > — B40
- PREVENT BLEED-THRU — ◯ — B41
- CONTRAST — NORMAL 0 > — B42
- TRAPPING — OFF > — B43
- ERASE COLORS — OFF > — B44

GROUP G5 「ADVANCED SETUP」
- CONTINUOUS SCAN — OFF > — B45
- AUTO IMAGE ROTATION — ◯ — B46
- NEGATIVE IMAGE — ◯ — B47
- MIRROR IMAGE — ◯ — B48
- JOB FINISH NOTICE — OFF > — B49
- FINE NAME ENTRY — DOC > — B50
- PRIORITY OVERRIDE — ◯ — B51
- REPEAT COPY — OFF > — B52
- SKIP BLANK PAGE — OFF > — B53

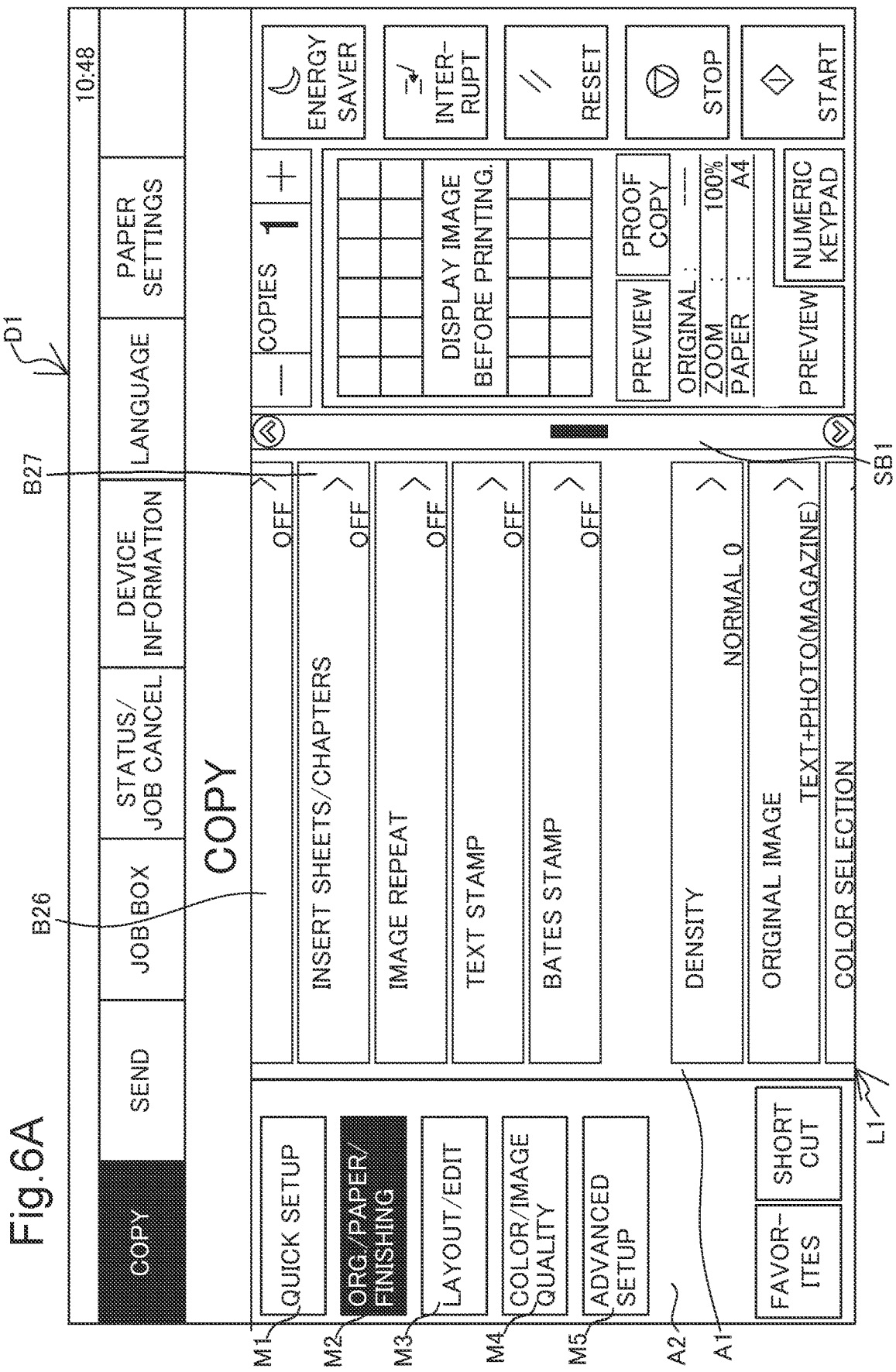

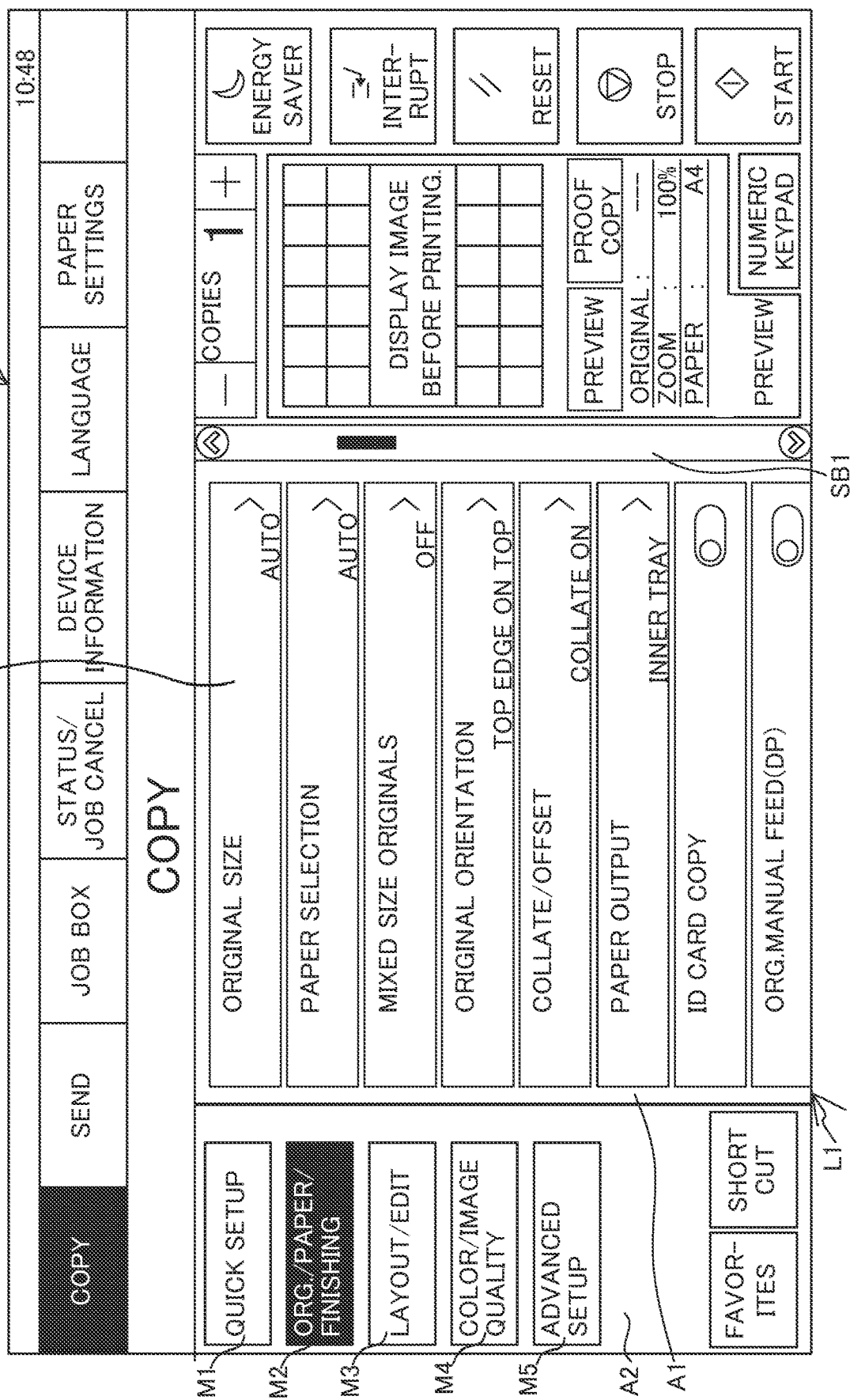

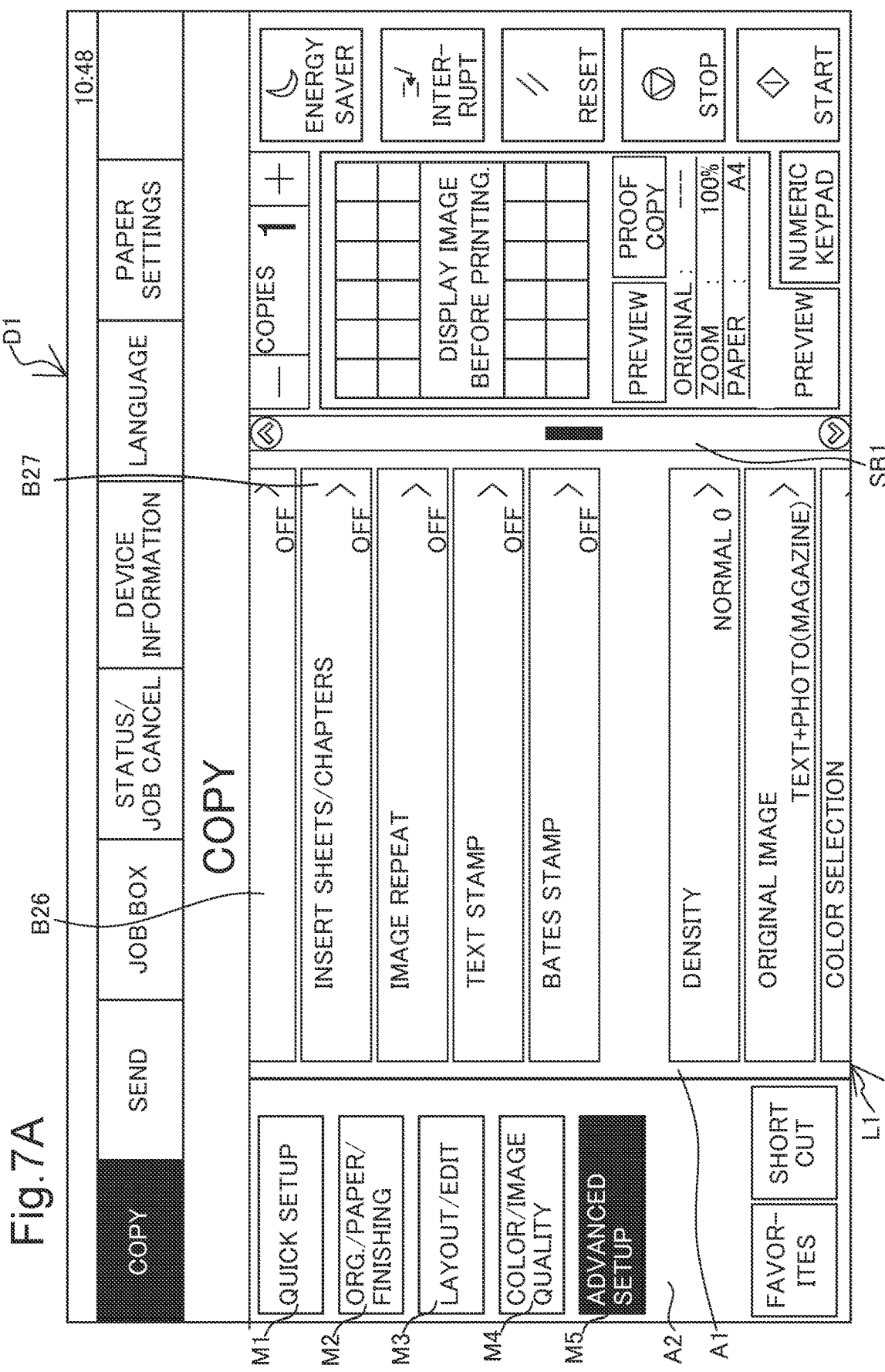

Fig.10

GROUP G1 「QUICK SETUP」 (GB1)
- AUTO — PAPER SELECTION (B1)
- 100% — ZOOM (B2)
- FULL COLOR — COLOR SELECTION (B3)
- 1-SIDED>>1-SIDED — DUPLEX (B4)
- OFF — COMBINE (B5)
- ID CARD COPY (B6)
- COLLATE/OFFSET (B7)
- ORIGINAL SIZE (B8)
- MIXED SIZE ORIGINALS (B9)

GROUP G2 「ORG./PAPER/FINISHING」 (GB2)
- ORIGINAL SIZE — AUTO (B10)
- PAPER SELECTION — AUTO (B11)
- MIXED SIZE ORIGINALS — OFF (B12)
- ORIGINAL ORIENTATION — TOP EDGE ON TOP (B13)
- COLLATE/OFFSET — COLLATE ON (B14)
- PAPER OUTPUT — INNER TRAY (B15)
- ID CARD COPY (B16)
- ORG.MANUAL FEED(DP) (B17)

GROUP G3 「LAYOUT/EDIT」 (GB3)
- ZOOM — 100% (B18)
- COMBINE — OFF (B19)
- MARGIN/CENTERING — OFF (B20)
- BORDER ERASE — STANDARD (B21)
- ERASE SHADOWED AREAS (B22)
- BOOKLET — OFF (B23)
- DUPLEX — OFF (B24)
- MEMO PAGE — OFF (B25)
- POSTER — OFF (B26)
- INSERT SHEETS/CHAPTERS — OFF (B27)
- IMAGE REPEAT — OFF (B28)
- TEXT STAMP — OFF (B29)
- BATES STAMP — OFF (B30)   L1

GROUP G4 「COLOR/IMAGE QUALITY」 (GB4)
- DENSITY — NORMAL 0 (B31)
- ORIGINAL IMAGE — TEXT+PHOTO(MAGAZINE) (B32)
- COLOR SELECTION — FULL COLOR (B33)
- ECOPRINT — OFF (B34)
- COLOR BALANCE — OFF (B35)
- HUE ADJUSTMENT — OFF (B36)
- ONE-TOUCH IMAGE ADJUST — OFF (B37)
- SHARPNESS — ALL NORMAL 0 (B38)
- BACKGROUND DENSITY ADJ. — OFF (B39)
- SATURATION — 0 (B40)
- PREVENT BLEED-THRU (B41)
- CONTRAST — NORMAL 0 (B42)
- TRAPPING — OFF (B43)
- ERASE COLORS — OFF (B44)

GROUP G5 「ADVANCED SETUP」 (GB5)
- CONTINUOUS SCAN — OFF (B45)
- AUTO IMAGE ROTATION (B46)
- NEGATIVE IMAGE (B47)
- MIRROR IMAGE (B48)
- JOB FINISH NOTICE — OFF (B49)
- FINE NAME ENTRY — DOC (B50)
- PRIORITY OVERRIDE (B51)
- REPEAT COPY — OFF (B52)
- SKIP BLANK PAGE — OFF (B53)

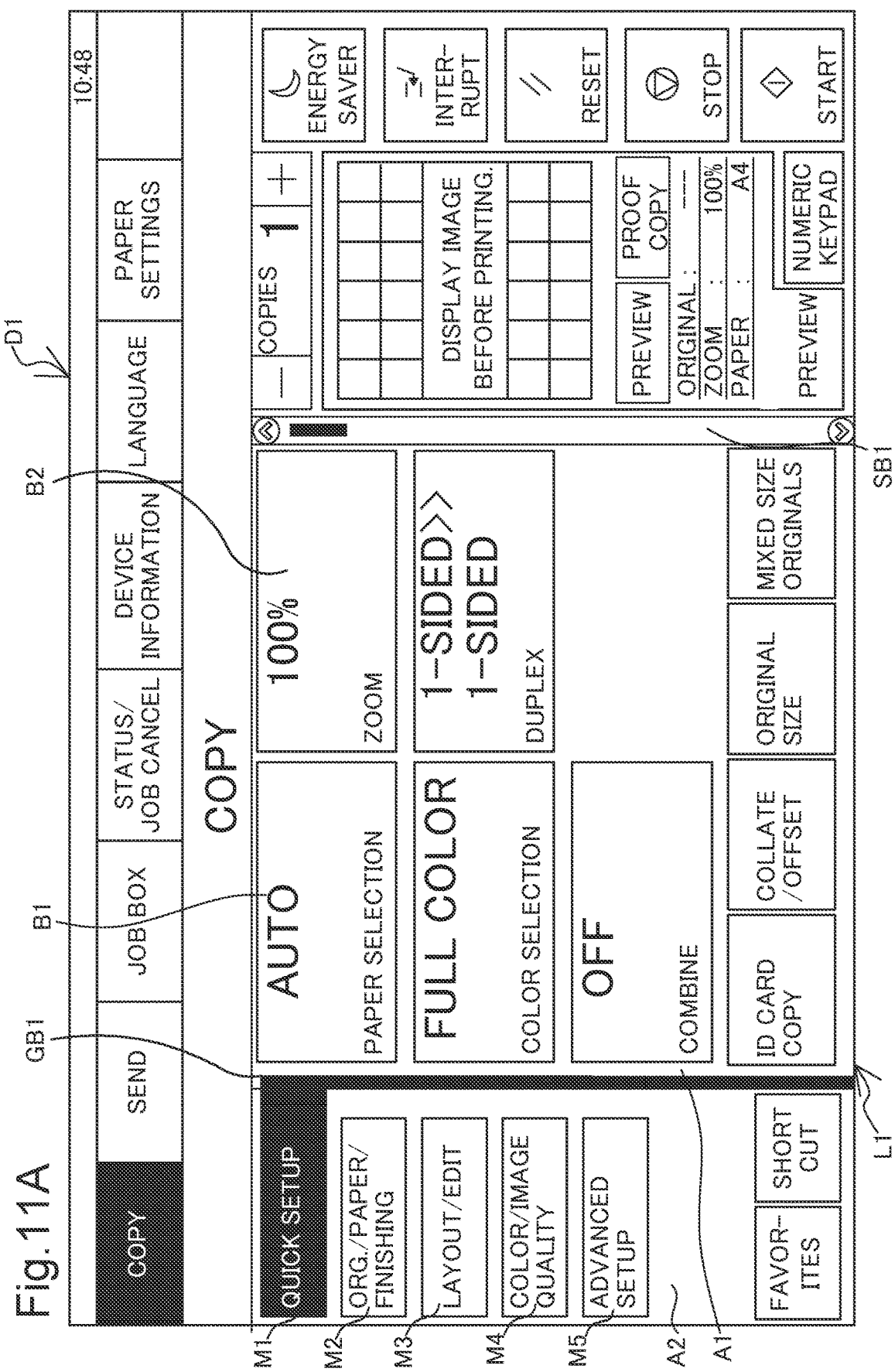

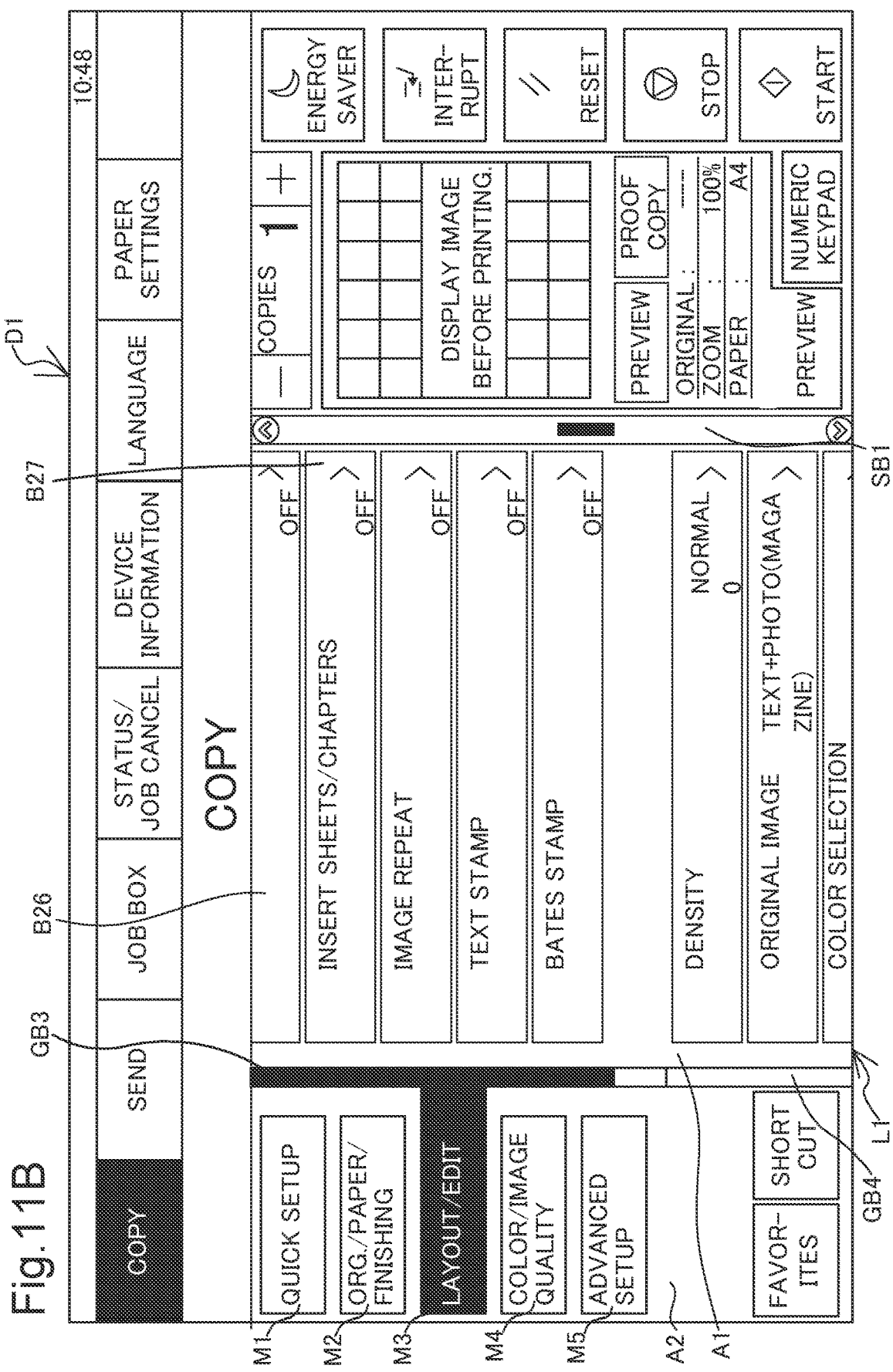

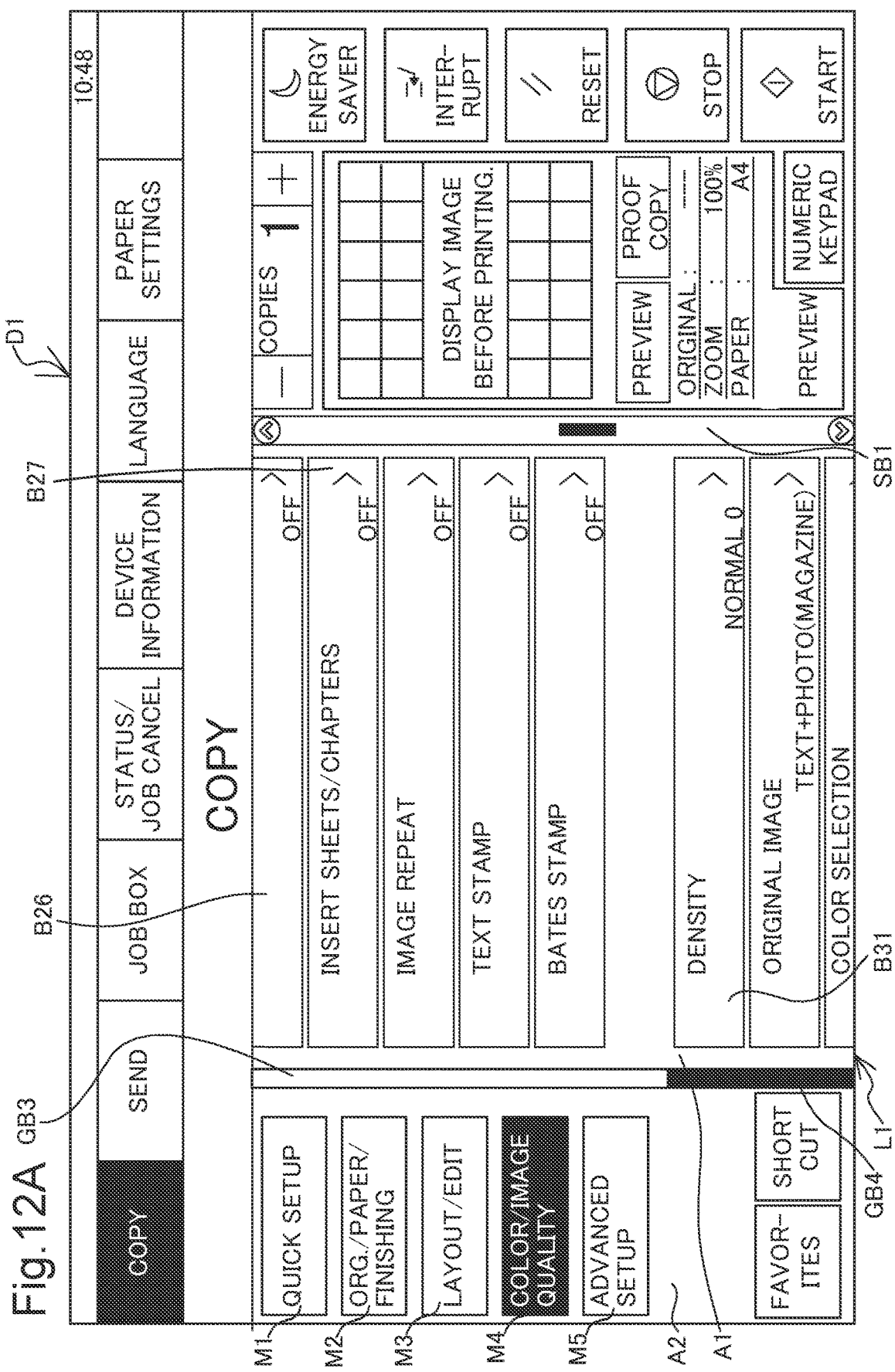

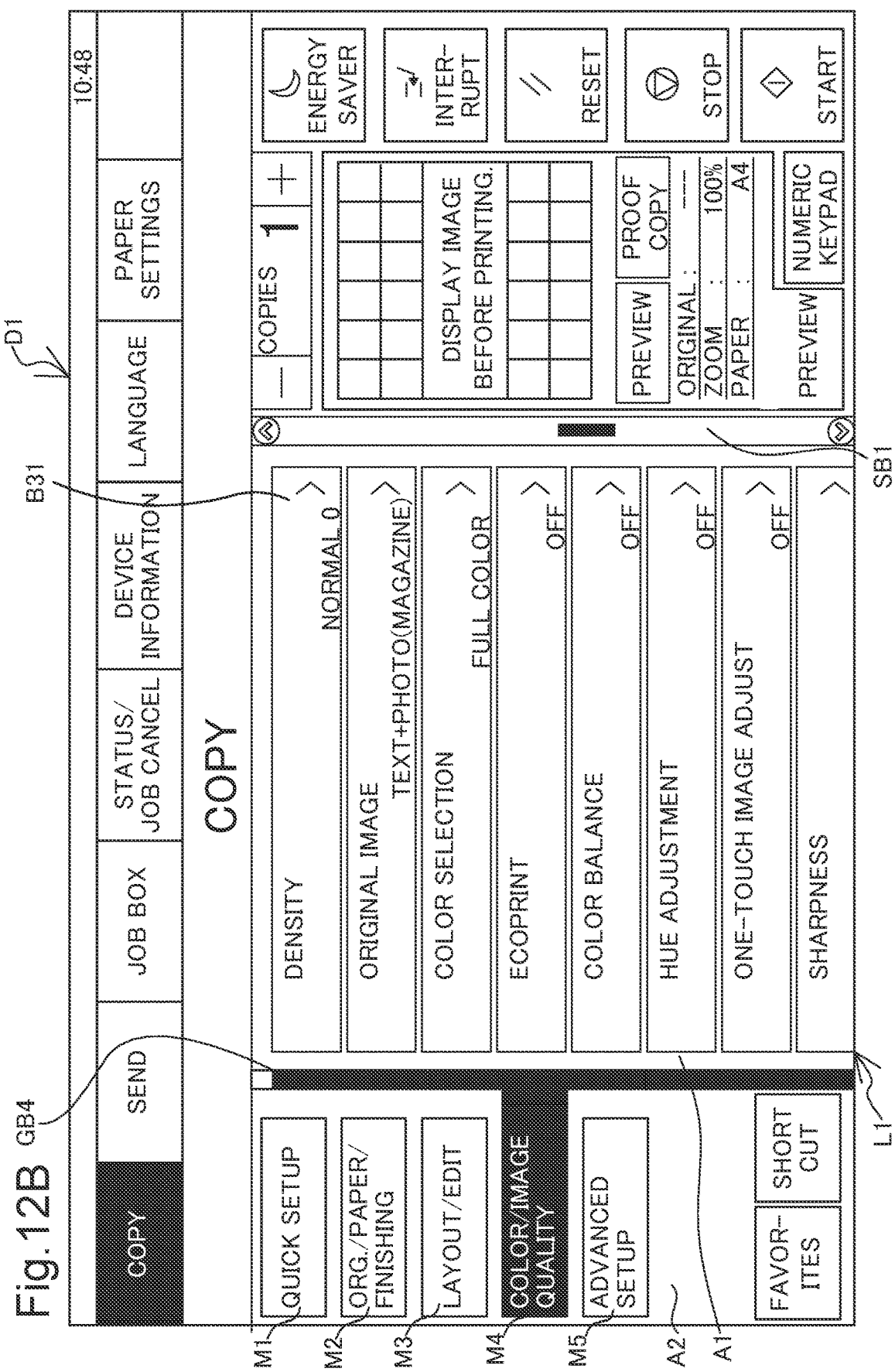

DISPLAY APPARATUS THAT DISPLAYS MENU ITEM INDICATING NAME OF GROUP INCLUDING ITEM TO BE SET DISPLAYED AT UPPERMOST POSITION OF SCROLLABLE DISPLAY REGION, IN DIFFERENT DISPLAY STYLE FROM OTHER MENU ITEMS, AND IMAGE FORMING APPARATUS

INCORPORATION BY REFERENCE

This application claims priority to Japanese Patent Application No. 2020-176674 filed on Oct. 21, 2020, the entire contents of which are incorporated by reference herein.

BACKGROUND

The present disclosure relates to a display apparatus including a touch panel and a display device, and to an image forming apparatus.

In recent years, the functions of electronic devices such as an image forming apparatus have significantly increased, making the display of operation screens on a display device more complicated. In addition, when the displayed content protrudes from a predetermined display region, because of the increased number of items to be set (e.g., operation buttons), a scroll function has to be employed.

In the electronic devices including a touch panel and a display device, in general, a technique is employed including listing up a plurality of items to be set along a scroll direction, and scrolling the listed items to be set, according to a scroll instruction of the user.

SUMMARY

The disclosure proposes further improvement of the foregoing techniques.

In an aspect, the disclosure provides display apparatus including a touch panel, a display device, and a control device. The control device includes a processor, and acts as a display controller that controls a displaying operation of the display device, when the processor executes a control program. The display controller causes the display device to display an operation screen including a scrollable display region for displaying a list of items to be set, in which a plurality of items to be set are classified into groups and listed along a scroll direction, and a menu display region for displaying menu items each indicating a name of the group, with respect to each of the groups, to scroll, when the touch panel receives a scroll instruction made on the scrollable display region, the list of items to be set according to the scroll instruction, and to display a first menu item indicating a name of a first group that includes a first item to be set displayed at an uppermost position of the scrollable display region, in a first display style visually different from other menu items.

In another aspect, the disclosure provides an image forming apparatus including the foregoing display apparatus, a document reading device, and an image forming device. The document reading device reads an image of a source document. The image forming device forms the image of the source document, acquired through a reading operation performed by the document reading device, on a recording sheet.

BRIEF DESCRIPTION OF THE DRAWINGS

FIG. 2 is a functional block diagram showing an essential internal configuration of the image forming apparatus;

FIG. 4 is a schematic drawing showing an example of a list of items to be set;

FIG. 6A and FIG. 6B are schematic drawings each showing an example of the operation screen;

FIG. 7A and FIG. 7B are schematic drawings each showing an example of the operation screen;

FIG. 10 is a schematic drawing showing an example of the list of items to be set, including a group range bar;

FIG. 11A and FIG. 11B are schematic drawings each showing an example of the operation screen;

FIG. 12A and FIG. 12B are schematic drawings each showing an example of the operation screen.

DETAILED DESCRIPTION

Figure 1:
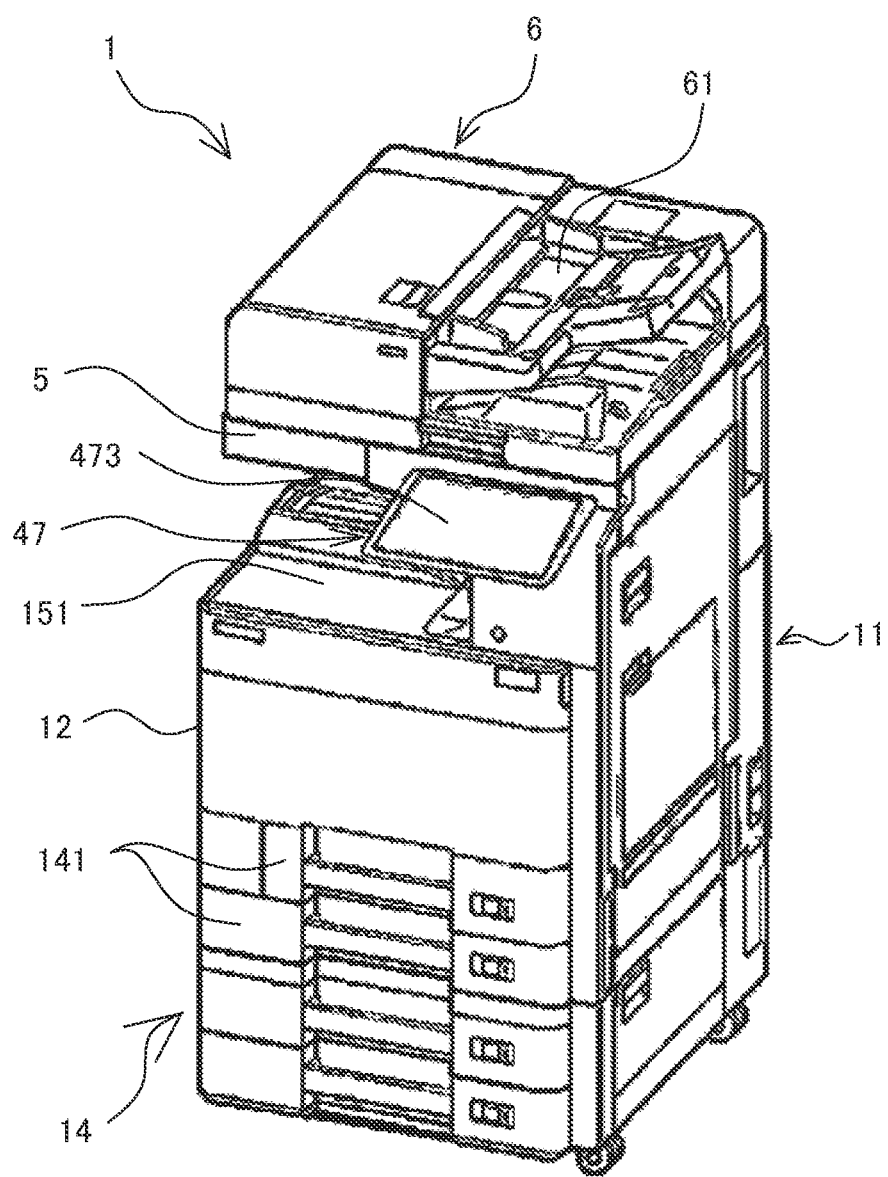
FIG. 1 is a perspective view showing an appearance of an image forming apparatus.

Hereafter, a display apparatus and an image forming apparatus according to some embodiments of the disclosure will be described, with reference to the drawings. FIG. 1 is a perspective view showing an appearance of the image forming apparatus 1 including a display apparatus 20, according to the embodiment of the disclosure. FIG. 2 is a functional block diagram showing an essential internal configuration of the image forming apparatus 1.

The image forming apparatus 1 is a multifunction peripheral having a plurality of functions, such as copying, printing, scanning, and facsimile transmission. The image forming apparatus 1 includes a control device 10, a document feeding device 6, a document reading device 5, an image forming device 12, a fixing device 13, a paper feeding device 14, an operation device 47, and a storage device 8, which are provided in an apparatus main body 11. The control device 10, and the operation device 47 including a display device 473 and a touch panel 474 constitute the display apparatus 20.

The document feeding device 6 is openably connected to the upper face of the document reading device 5 via a hinge. The document feeding device 6 serves as a document retention cover, when the document reading device 5 reads a source document placed on the platen glass. The document feeding device 6 is configured as an automatic document feeder (ADF) including a document tray 61. The document feeding device 6 delivers the source documents placed on the document tray 61 one by one, to the document reading device 5.

The document feeding device 6 is configured to mechanically reverse the front and back of the source document, after the document reading device 5 has read the front face of the source document, and to again deliver the source document to the document reading device 5. Accordingly, the document reading device 5 can perform duplex reading of the source document.

To perform the document reading operation, the image forming apparatus 1 operates as follows. The document reading device 5 optically reads the image on a source document delivered from the document feeding device 6 to the document reading device 5, or placed on a platen glass, and generates image data. The document reading device 5 stores the generated image data, for example, in an image memory.

To perform the image forming operation, the image forming apparatus 1 operates as follows. The image forming device 12 forms a toner image on a recording sheet, serving as a recording medium, and delivered from the paper feeding device 14, on the basis of the image data generated through the document reading operation, the image data stored in the image memory, or image data received from a computer connected via a network.

The fixing device 13 heats and presses the recording sheet on which the toner image has been formed by the image forming device 12, to thereby fix the toner image on the recording sheet. The recording sheet that has undergone the fixing process is delivered to an output tray 151. The paper feeding device 14 includes a plurality of paper cassettes 141.

The operation device 47 receives instructions from the user to execute the functions and operations that the image forming apparatus 1 is configured to perform. The operation device 47 includes the display unit 473 for displaying, for example, an operation guide for the user. The operation device 47 receives, through the touch panel 474 provided on the display device 473, the user's instruction detected by the touch panel 474 according to a touch operation of the user performed on the display device 473.

The display device 473 includes, for example, a liquid crystal display (LCD). The touch panel 474 is overlaid on the display device 473. When the user touches a button or a key displayed on the screen, the touch panel 474 detects the instruction corresponding to the touched position.

The storage device 8 is a large-capacity storage device such as a hard disk drive (HDD) and a solid-state drive (SSD). The storage device 8 contains various control programs.

The control device 10 includes a processor, a random-access memory (RAM), a read-only memory (ROM), and an exclusive hardware circuit. The processor is, for example, a central processing unit (CPU), an application specific integrated circuit (ASIC), or a micro processing unit (MPU).

The control device 10 acts as a controller 100 and a display controller 101, when the processor executes a control program stored in the storage device 8. Here, the controller 100 and the display controller 101 may each be constituted in the form of a hardware circuit, instead of being performed according to the control program. This also applies to other embodiments, unless otherwise specifically noted.

The controller 100 serves to control the overall operation of the image forming apparatus 1. The controller 100 is connected to the document feeding device 6, the document reading device 5, the image forming device 12, the fixing device 13, the paper feeding device 14, the operation device 47, and the storage device 8, and controls the operation of the mentioned components. For example, the controller 100 controls the operation of the image forming device 12, so as to form the source image acquired through the reading operation of the document reading device 5, on the recording sheet.

The display controller 101 controls the displaying operation of the display device 473. For example, the display controller 101 causes the display device 473 to display an operation screen, according to the user's instruction inputted through the operation device 47.

Figure 3A:
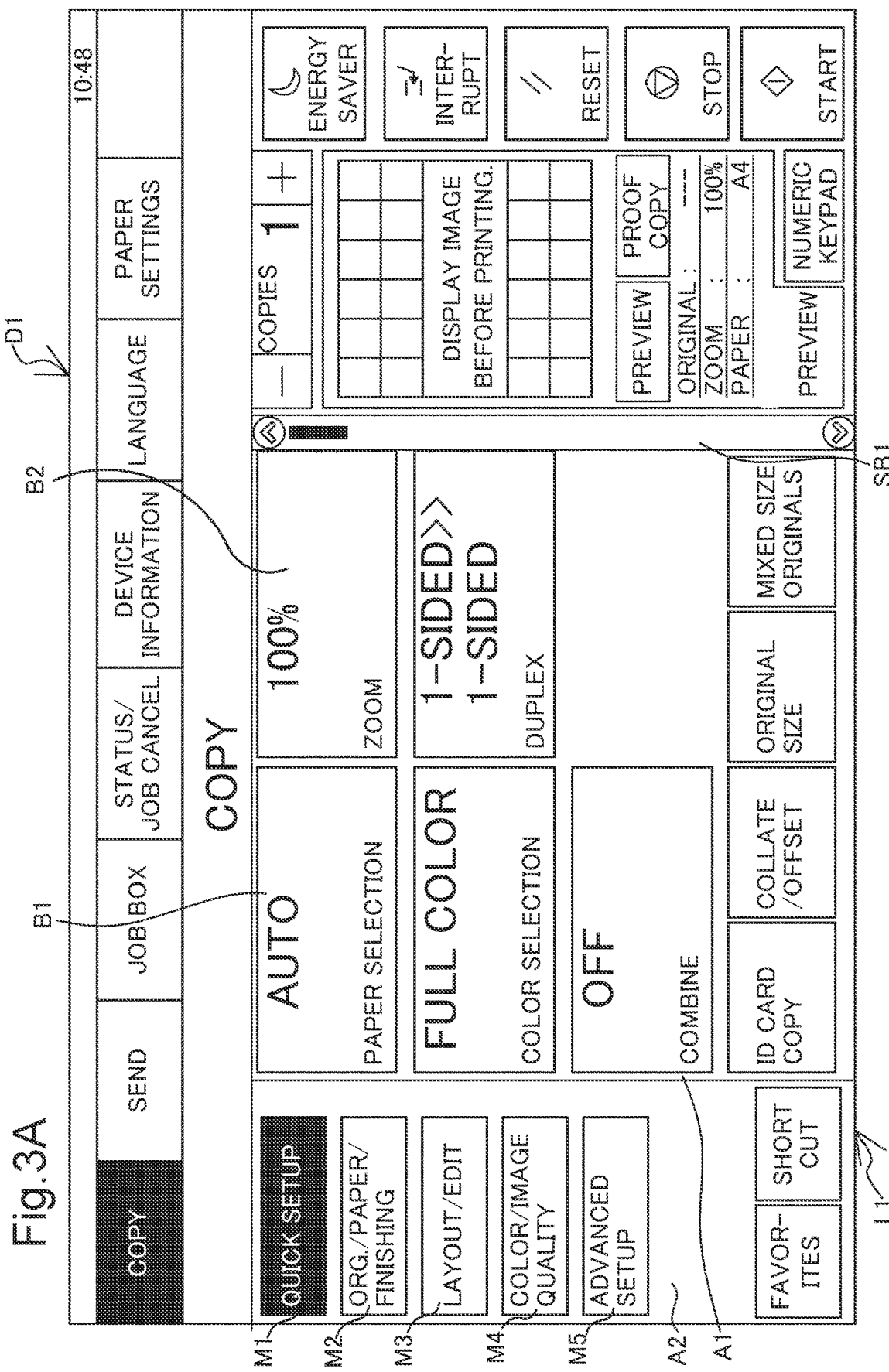
FIG. 3A and FIG. 3B are schematic drawings each showing an example of an operation screen.
Figure 3B:
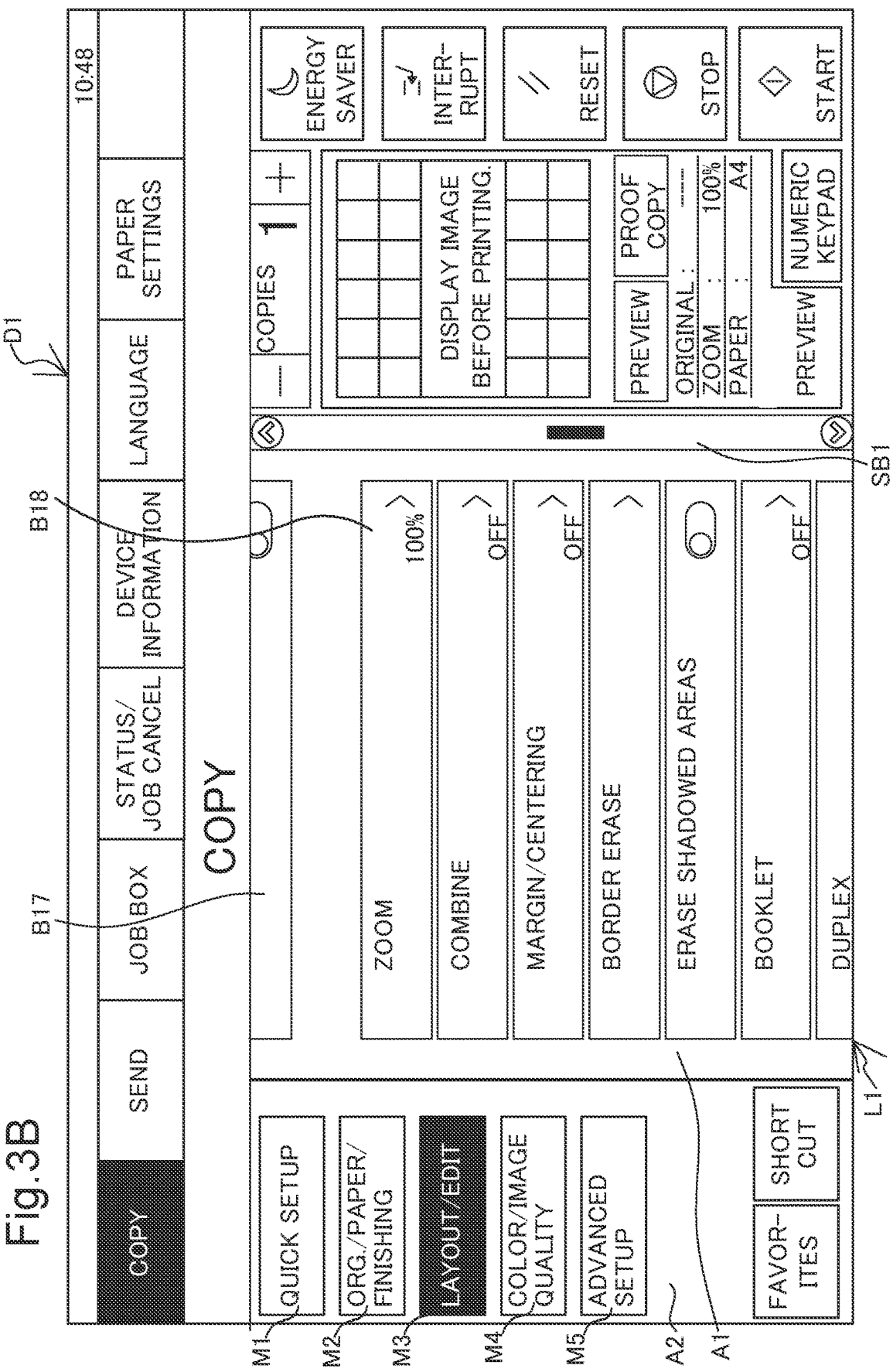

FIG. 3A and FIG. 3B are schematic drawings each showing an example of the operation screen that the display controller 101 causes the display device 473 to display. FIG. 4 is a schematic drawing showing an example of a list of items to be set, displayed in a scrollable display region A1.

The operation screen D1 shown in FIG. 3A and FIG. 3B is for setting various functions related to the copying operation. When the user touches the screen of the display device 473 (i.e., operation screen D1), the operation device 47 receives the instruction related to the copying operation. The controller 100 performs various settings, necessary for executing the operation including generating the image data through reading of the source document, and forming the image based on the image data on the recording sheet (i.e., copying operation), according to the instruction received.

The operation screen D1 includes a scrollable display region A1, a menu display region A2, and a scroll bar SB1 for scrolling the image displayed in the scrollable display region A1. The display controller 101 displays the scroll bar SB1 at a position other than the display regions A1 and A2.

The display controller 101 displays menu items M1 to M5, each indicating the name of a group, in the menu display region A2.

The display controller 101 partially displays a list of items to be set L1, in the scrollable display region A1. As shown in FIG. 4, the list of items to be set L1 includes operation buttons B1 to B53 each representing the item to be set. The operation buttons are classified into groups, and such groups are sequentially sorted. In the list of items to be set L1, the operation buttons B1 to B53 are listed along the scroll direction, with a spacing between the groups. The operation buttons B1 to B53 in the list of items to be set L1 are each associated with one of the items to be set when the copying operation is to be performed.

In the illustrated example, the operation buttons B1 to B9 are included in a group G1, named "Quick Setup". The operation buttons B10 to B17 are included in a group G2 named "Org./Paper/Finishing". The operation buttons B18 to B30 are included in a group G3 named "Layout/Edit". The operation buttons B31 to B44 are included in a group G4 named "Color/Image Quality". The operation buttons B45 to B53 are included in a group G5 named "Advanced Setup".

The menu item M1 displayed in the menu display region A2 is associated with the group G1. The menu item M2 is associated with the group G2. The menu item M3 is associated with the group G3. The menu item M4 is associated with the group G4. The menu item M5 is associated with the group G5.

The display controller 101 displays the names of the respectively corresponding groups, in the menu item M1 to M5. For example, the display controller 101 displays the group name "Quick Setup" of the group G1, in the menu item M1. In this embodiment, the name of each group indicates the category of the functions, to which the item to be set included in the group corresponds.

The items to be set and the sorting order thereof, the groups including the items to be set, and the menu items respectively associated with the groups, indicated by the list of items to be set L1, are stored in the storage device 8, under the control of the display controller 101.

When the operation device 47 receives a scroll instruction with respect to the scrollable display region A1, based on the user's touch operation on the touch panel 474, the display controller 101 scrolls the image (list of items to be set L1) displayed on the scrollable display region A1, according to the scroll instruction. The touch operation for inputting the scroll instruction includes an upward or downward flick or swipe on the scrollable display region A1, or touching an arrow or knob constituting the scroll bar SB1.

The items to be set, to be displayed at the uppermost position of the scrollable display region A1 as result of the scroll action, for example on the basis of the scroll distance from the initial display state of the list of items to be set L1 in the scrollable display region A1 shown in FIG. 3A, are stored in the storage device 8, under the control of the display controller 101.

The display controller 101 displays the menu item indicating the name of the group including the operation button corresponding to the item to be set, displayed at the uppermost position of the scrollable display region A1, in a display style visually different from the other menu items. For example, as shown in FIG. 3A, the display controller 101 displays the operation button B1 marked as "Auto Paper Selection", and the operation button B2 marked as "100% Zoom", at the uppermost position of the scrollable display region A1. In this case, since the operation buttons B1 and B2 are included in the group G1, the display controller 101 displays the menu item M1 marked as "Quick Setup" corresponding to the group G1, in a predetermined eye-catching color (e.g., while letters on blue background, or deeper or brighter color than other menu items). The display controller 101 displays the other menu items M2 to M5 in a weaker color, for example gray, than the eye-catching color of the menu item M1. For example, when the eye-catching color is a bright color, a dark color is used for the other menu items. In this case, the dark color is included in the scope of the faint color referred to above. Thus, the term "faint color" used herein refers to a predetermined color that is less eye-catching, than the eye-catching color.

For example, although the operation button B17 is displayed at the uppermost position scrollable display region A1, the operation button B17 is only partially displayed, as shown in FIG. 3B. In such a case, the display controller 101 decides that the operation button B18 marked as "Zoom", located under the operation button B17, is displayed at the uppermost position of the scrollable display region A1, because the operation button B18 is entirely displayed therein. Since the operation button B18 is included in the group G3, the display controller 101 displays the menu item M3 marked as "Layout/Edit" corresponding to the group G3 in the eye-catching color, and displays the other menu items M1, M2, M4, and M5 in the faint color.

Thus, each time the group corresponding to the item to be set (operation button) displayed at the uppermost position of the scrollable display region A1 is shifted, because of the scrolling of the list of items to be set L1 based on the scroll instruction from the user, the display controller 101 switches the display of the menu item, to be displayed in the eye-catching color visually different from other menu items, to the menu item indicating the name of the group corresponding to the item to be set (operation button) newly displayed at the uppermost position of the scrollable display region A1.

Hereunder, description will be given regarding the case where the user has inputted the upward or downward scroll instruction through the operation device 47, for example when the menu item M3 indicating the group G3 is being displayed in the eye-catching color, as shown in FIG. 3B.

[When Upward Scroll Instruction is Inputted]

Upon receipt of the upward scroll instruction from the user through the operation device 47, the display controller 101 scrolls upward the image (list of items to be set L1) displayed in the scrollable display region A1.

Figure 5A:
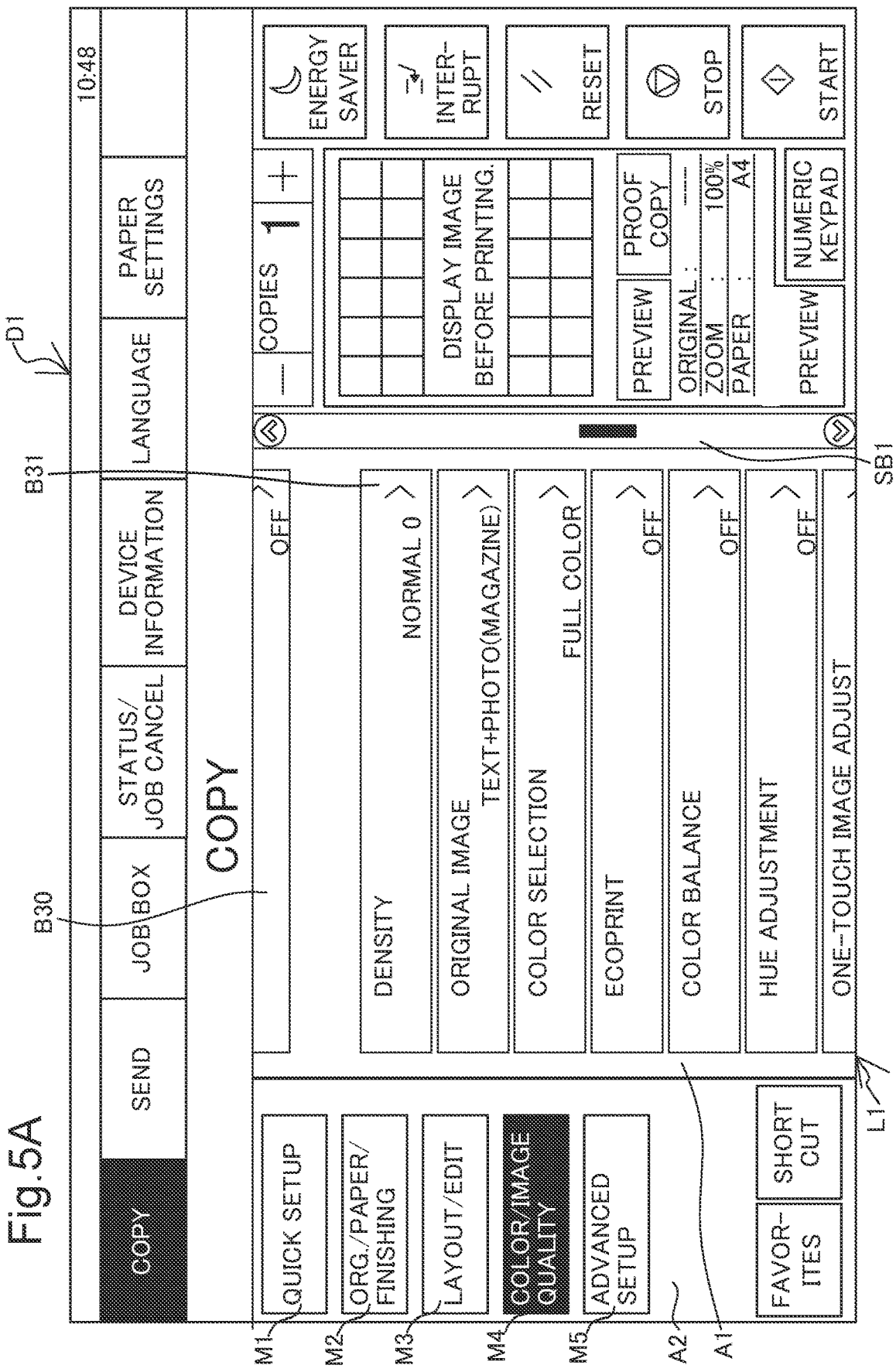
FIG. 5A and FIG. 5B are schematic drawings each showing an example of the operation screen.

As result of the upward scroll, the operation button B30 located at the tail end of the group G3 is partially hidden as shown in FIG. 5A, and the operation button B31 marked as "Density", located at the head of the group G4, is regarded as the operation button displayed at the uppermost position of the scrollable display region A1. In other words, the group corresponding to the operation button displayed at the uppermost position of the scrollable display region A1 is switched from the group G3 to the group G4. Accordingly, the display controller 101 displays the menu item M3 corresponding to the group G3 in the faint color, and displays the menu item M4 marked as "Color/Image Quality" corresponding to the group G4, in the eye-catching color.

[When Downward Scroll Instruction is Inputted]

Upon receipt of the downward scroll instruction from the user through the operation device 47, the display controller 101 scrolls down the image (list of items to be set L1) displayed in the scrollable display region A1.

Figure 5B:
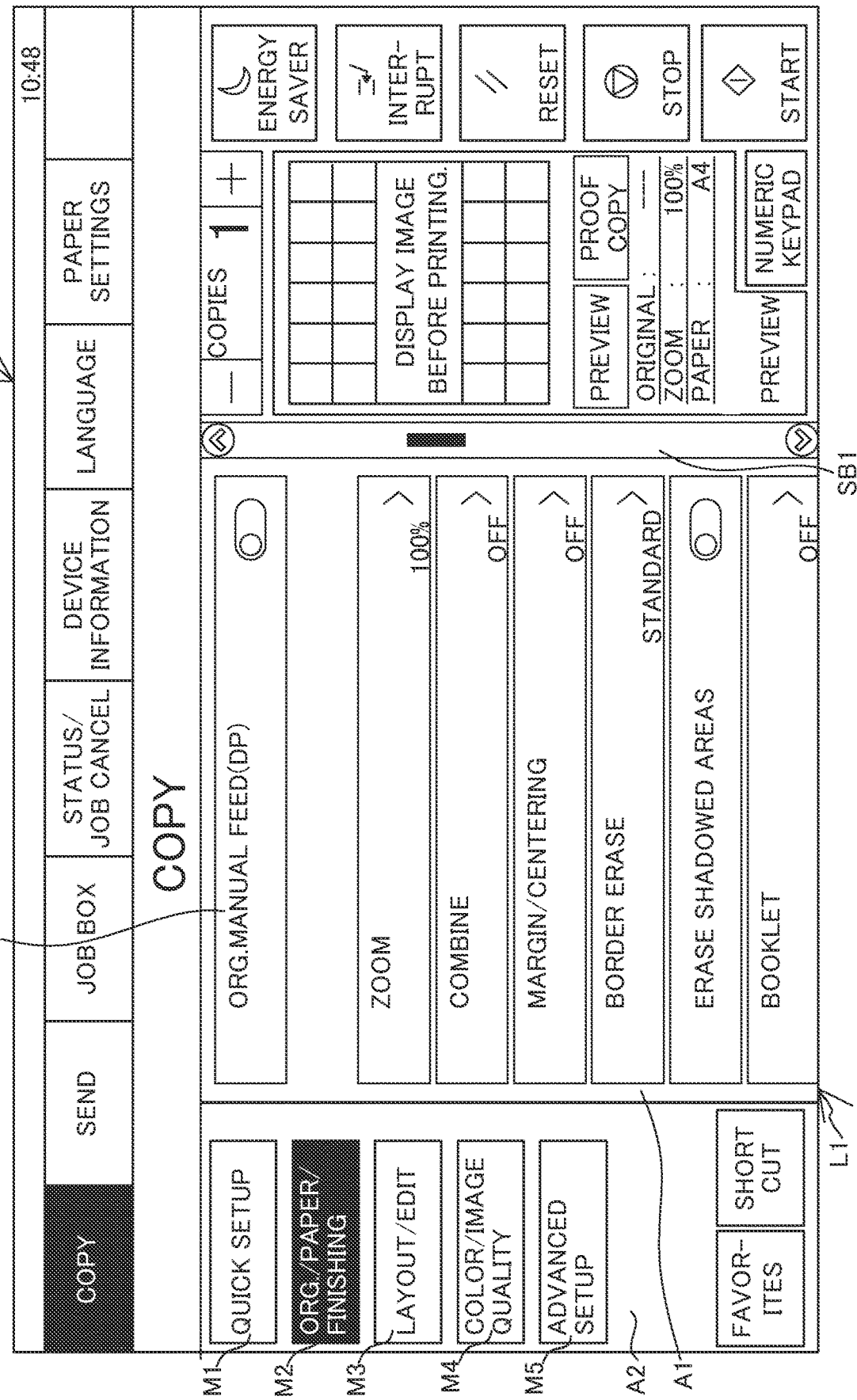

As result of the downward scroll, the operation button B17 marked as "Org. Manual Feed(DP)" and located at the tail end of the group G2 entirely appears as shown in FIG. 5B, so that the operation button B17 included in the group G2 is displayed at the uppermost position of the scrollable display region A1. In other words, the group corresponding to the operation button displayed at the uppermost position of the scrollable display region A1 is switched from the group G3 to the group G2. Accordingly, the display controller 101 displays the menu item M3 corresponding to the group G3 in the faint color, and displays the menu item M2 marked as "Org./Paper/Finishing" corresponding to the group G2, in the eye-catching color.

When the operation device 47 receives an instruction to select one of the menu items M1 to M5, the display controller 101 switches the menu item to be displayed in the eye-catching color, from the menu item thus far displayed in the eye-catching color, to the menu item newly selected by the user. In addition, the display controller 101 scrolls the list of items to be set L1, so as to bring the item to be set (operation button) located at the head of the group indicated by the newly selected menu item, to the uppermost position of the scrollable display region A1.

Hereunder, description will be given regarding the case where the user has selected the menu item M2 or the menu item M5, for example when the menu item M3 indicating the group G3 is being displayed in the eye-catching color, as shown in FIG. 3B.

[When Menu Item M2 is Selected]

When the operation device 47 receives the instruction to select the menu item M2, the display controller 101 switches the display of the menu item M3 from the eye-catching color to the faint color, and switches the display of the menu item M2 marked as "Org./Paper/Finishing", from the faint color to the eye-catching color, as shown in FIG. 6A.

In addition, the display controller 101 scrolls downward the image (list of items to be set L1) displayed in the scrollable display region A1, so as to introduce the operation button B10 marked as "Original Size" and located at the head of the group G2 indicated by the menu item M2 into the scrollable display region A1, and then stops scrolling, when the operation button B10 located at the head of the group G2 has reached the uppermost position of the scrollable display region A1, as shown in FIG. 6B.

[When Menu Item M5 is Selected]

When the operation device 47 receives the instruction to select the menu item M5, the display controller 101 switches the display of the menu item M3 from the eye-catching color to the faint color, and switches the display of the menu item M5 marked as "Advanced Setup", from the faint color to the eye-catching color, as shown in FIG. 7A.

Figure 7B:
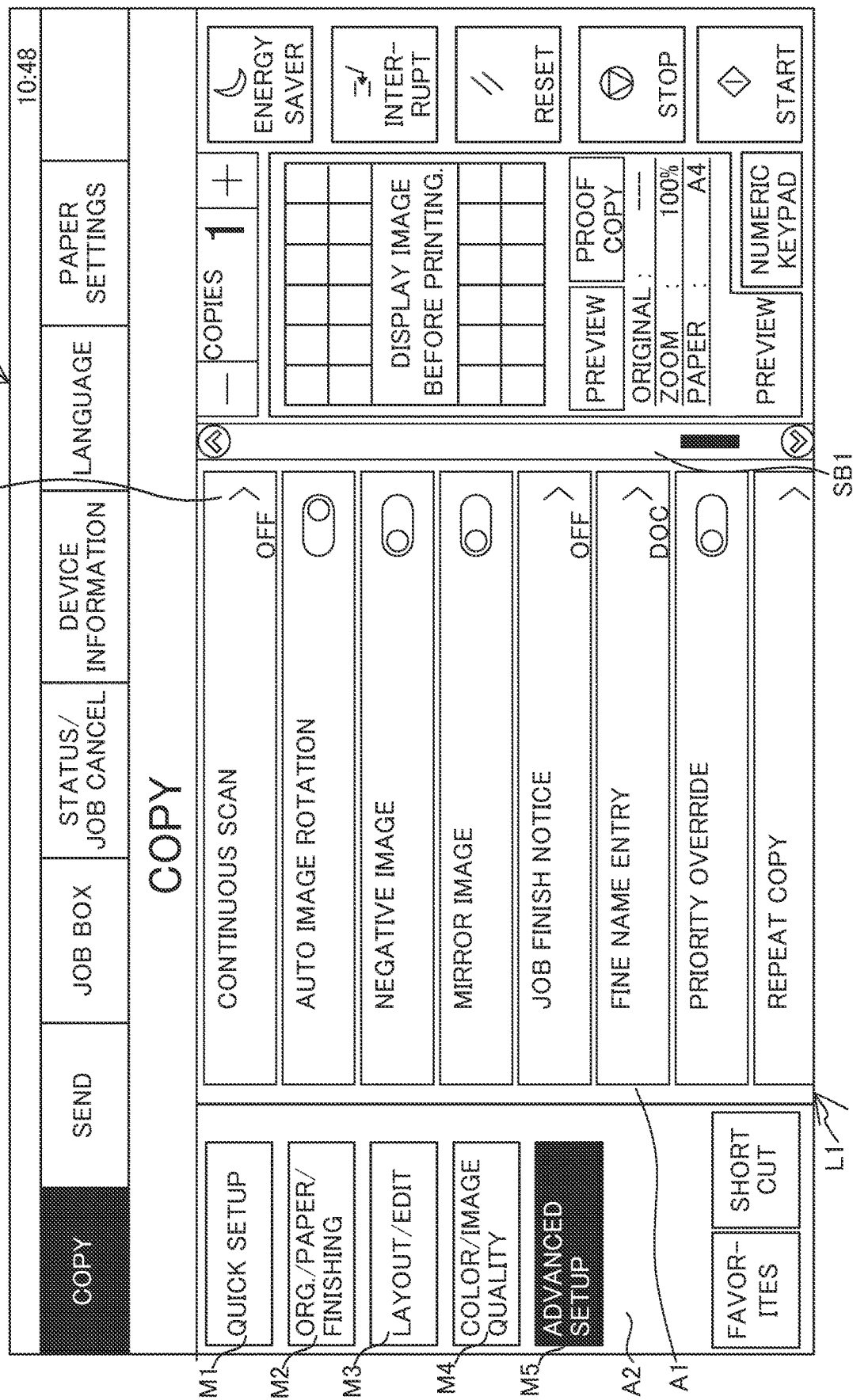

In addition, the display controller 101 scrolls upward the image (list of items to be set L1) displayed in the scrollable display region A1, so as to bring the operation button B45 marked as "Continuous Scan" and located at the head of the group G5 indicated by the menu item M5, to the uppermost position of the scrollable display region A1 as shown in FIG. 7B, and then stops scrolling.

Figure 8:
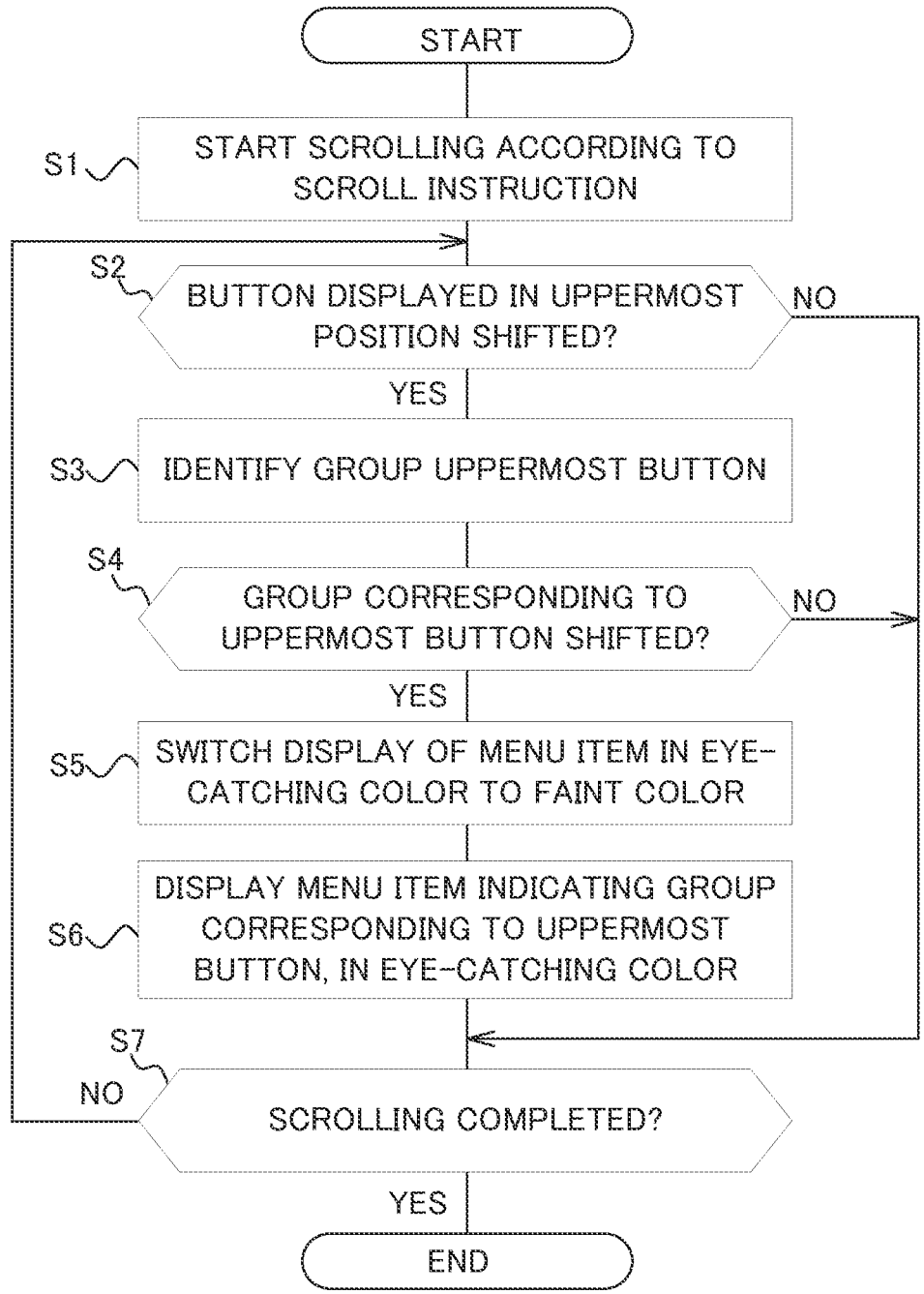
FIG. 8 is a flowchart showing a first display control process according to a first embodiment.

Hereunder, a first display control process according to the first embodiment of the disclosure, performed in the image forming apparatus 1, will be described with reference to a flowchart shown in FIG. 8. The first display control process is executed by the display controller 101, when the operation device 47 receives the scroll instruction with respect to the scrollable display region A1.

When the operation device 47 receives the scroll instruction with respect to the scrollable display region A1 from the user, the display controller 101 starts the scrolling action according to the scroll instruction, to scroll the image (list of items to be set L1) displayed in the scrollable display region A1, by an amount and in a direction indicated by the scroll instruction (step S1).

The display controller 101 decides, during the scrolling action based on the scroll instruction, whether the operation button thus far displayed at the uppermost position of the scrollable display region A1 has been shifted to another operation button (step S2).

Upon deciding that the operation button thus far displayed at the uppermost position of the scrollable display region A1 has been shifted to another operation button (YES at step S2), the display controller 101 identifies the group corresponding to the operation button displayed at the uppermost position, on the basis of the relation between each of the items to be set and the groups of the items to be set, stored in the storage device 8 (step S3). Further, the display controller 101 decides whether the group corresponding to the operation button thus far displayed at the uppermost position has been shifted to another group (step S4).

Upon deciding that the group corresponding to the operation button thus far displayed at the uppermost position has been shifted to another group (YES at step S4), the display controller 101 switches the display of the menu item thus far displayed in the eye-catching color to the faint color (step S5), and also displays the menu item indicating the group corresponding to the operation button newly displayed at the uppermost position, in the eye-catching color (step S6).

For example, when the group corresponding to the operation button displayed at the uppermost position of the scrollable display region A1 is shifted from the group G3 to the group G4, the display controller 101 switches the display of the menu item M3 (thus far displayed in the eye-catching color) indicating the group G3, to the faint color, and switches the display of the menu item M4 (thus far displayed in the faint color) indicating the group G4, to the eye-catching color, as shown in FIG. 5A.

Then the display controller 101 decides whether the scrolling action of the amount and direction according to the scroll instruction has been completed (step S7). Upon deciding that the scrolling action has been completed (YES at step S7), the display controller 101 finishes the first display control process. In contrast, upon deciding that the scrolling action has not been completed (NO at step S7), the display controller 101 returns to step S2. When the display controller 101 decides that the operation button displayed at the uppermost position of the scrollable display region A1 has been shifted (YES at step S2), the display controller 101 repeats the operation of step S3 to step S7.

When the display controller 101 decides at step S2 that the operation button displayed at the uppermost position of the scrollable display region A1 has not been shifted (NO at step S2), and also decides at step S4 that the group corresponding to the operation button thus far displayed at the uppermost position has not been shifted to another group (NO at step S4), the display controller 101 proceeds to step S7.

Figure 9:
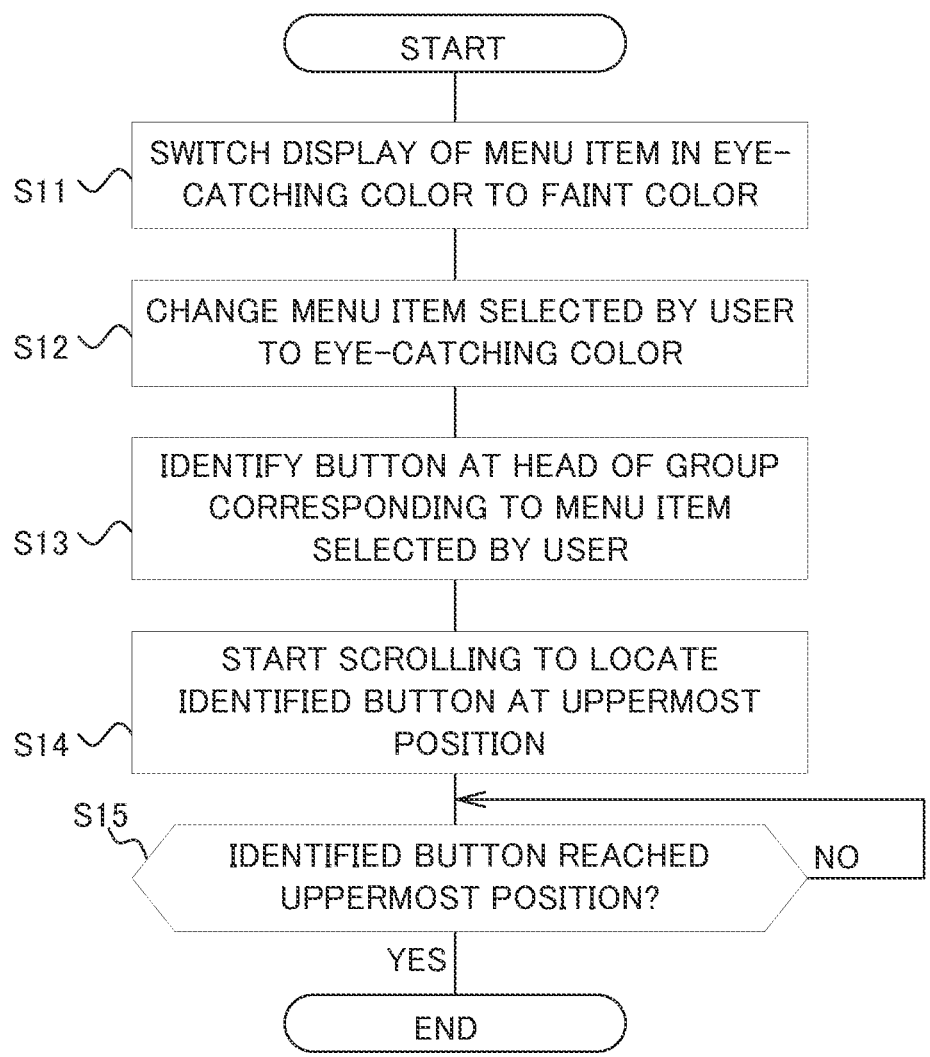
FIG. 9 is a flowchart showing a second display control process according to the first embodiment.

Hereunder, a second display control process according to the first embodiment of the disclosure, performed in the image forming apparatus 1, will be described with reference to a flowchart shown in FIG. 9. The second display control process is executed by the display controller 101, when the operation device 47 receives the instruction to select one of the menu items M1 to M5.

When the operation device 47 receives the instruction to select one of the menu items M1 to M5, the display controller 101 displays the menu item thus far displayed in the eye-catching color in the faint color (step S11), and displays the menu item newly selected by the user in the eye-catching color (step S12).

The display controller 101 identifies the operation button located at the head of the group indicated by the menu item selected by the user, in the list of items to be set L1, on the basis of the items to be set and the sorting order thereof, the relation between each of the groups and the items to be set included therein, and the relation between each of the groups and the corresponding menu item, which are stored in the storage device 8 (step S13). Thereafter, the display controller 101 starts to scroll the image (representing the list of items to be set L1) displayed in the scrollable display region A1, so as to bring the identified operation button to the uppermost position of the scrollable display region A1 (step S14). Then the display controller 101 decides whether the identified operation button has reached the uppermost position of the scrollable display region A1 (step S15).

Upon deciding that the identified operation button has reached the uppermost position of the scrollable display region A1 (YES at step S15), the display controller 101 finishes the second display control process.

For example, when the user selects the menu item M2, the display controller 101 displays the menu item M2 selected by the user in the eye-catching color, and displays the other menu items M1 and M3 to M5 in the faint color, as shown in FIG. 6A. The display controller 101 also scrolls the list of items to be set L1, so as to bring the operation button B10 located at the head of the group G2 indicated by the menu item M2, to the uppermost position of the scrollable display region A1. Then the display controller 101 finishes the scrolling action, when the operation button B10 has reached the uppermost position of the scrollable display region A1, as shown in FIG. 6B.

According to the first embodiment, when the user selects one of the menu items, the item to be set located at the head of the group associated with the selected menu item is displayed at the uppermost position of the scrollable display region A1. Such an arrangement facilitates the user to recognize, when the user selects one of the menu items, the items to be set included in the group associated with the selected menu item.

Now, although many items to be set can be displayed in the display region of a limited size, by scrolling the items to be set, it is difficult for the user to recognize, from the many items to be set being sequentially displayed, for which function the displayed item to be set is to be used. However, including various types of information in the content displayed on the screen, in order to indicate for which function the displayed item to be set is to be used, makes the display more complicated, thereby conversely impeding the user from recognizing the relation between the displayed item to be set and the function.

With the arrangement according to the first embodiment, unlike the above, the menu item indicating the name of the group that includes the item to be set (operation button) displayed at the uppermost position of the scrollable display region A1, is displayed in the display style visually different from the other menu items. Therefore, even though the items to be set are sequentially displayed part by part by the scrolling action, the user can immediately recognize the name of the group, corresponding to the items to be set including the item to be set displayed at the uppermost position of the scrollable display region A1 of the display device 473. The mentioned arrangement allows the user to easily recognize for which group the item to be set displayed on the screen is to be used, without making the content on the screen more complicated, even though all the items to be set are unable to be displayed on the screen at a time, and the items to be set have to be sequentially scrolled.

Further, as described above, the display of the menu item, indicating the group corresponding to the item to be set located at the uppermost position of the scrollable display region A1, is turned to the eye-catching color, and therefore for which group the item to be set displayed at the uppermost position of the scrollable display region A1, and other items to be set in the same group, are to be used, can be clearly recognized. Such an arrangement allows the user to easily recognize for which group the item to be set displayed on the screen is to be used, without making the content on the screen more complicated.

Hereunder, a second embodiment of the display control operation performed by the image forming apparatus 1 will be described. The second embodiment is different from the first embodiment in that the group range bar indicating the range of each of the groups G1 to G5 is displayed in the scrollable display region A1, side by side with the list of items to be set L1.

FIG. 10 illustrates an example of the list of items to be set, adjacent to which the group range bar is displayed. The group range bars GB1 to GB5 shown in FIG. 10 each indicate the range of the corresponding group, with respect to each of the groups G1 to G5. For example, the group range bar GB1 is associated with the group G1, and indicates that the operation buttons B1 to B9 belong to the same group G1.

As shown in FIG. 11A to FIG. 12B, the display controller 101 displays, in the scrollable display region A1, the group range bars GB1 to GB5 between the menu items M1 to M5 and the list of items to be set L1, so as to extend along the corresponding items to be set, by the side of the list of items to be set L1.

The display controller 101 also displays the group range bar, indicating the range of the menu item displayed in the eye-catching color, in the same eye-catching color, thereby making such group range bar visually different from the other group range bars.

For example, when the menu item M1 indicating the group G1 is displayed in the eye-catching color as shown in FIG. 11A, the display controller 101 displays the group range bar GB1 indicating the range of the group G1, in the same eye-catching color as that of the menu item M1. In addition, the display controller 101 extends the menu item M1 toward the group range bar GB1, thus making the menu item M1 wider than the other menu items, and connects the menu item M1 to the group range bar GB1.

Further, when the menu item M3 indicating the group G3 is displayed in blue, an example of the eye-catching color, as shown in FIG. 11B, the display controller 101 also displays the group range bar GB3 indicating the range of the group G3 in blue, which is the same eye-catching color as that of the menu item M3. The display controller 101 also extends the menu item M3 toward the group range bar GB3, thus making the menu item M3 wider than the other menu items, and connects the menu item M3 to the group range bar GB3.

Hereunder, description will be given regarding the case where the user has selected the menu item M4, when the menu item M3 indicating the group G3 and the group range bar GB3 are displayed in the eye-catching color, as shown in FIG. 11B.

When the operation device 47 receives the instruction to select the menu item M4, the display controller 101 switches the color of the menu item M3 and the group range bar GB3 from the eye-catching color to the faint color, and puts the horizontal size of the menu item M3 (width in the direction toward the group range bar GB3) back to the original length, as shown in FIG. 12A. The display controller 101 also switches the color of the menu item M4 marked as "Color/Image Quality" and the group range bar GB4, from the faint color to the eye-catching color.

Further, the display controller 101 scrolls upward the image (list of items to be set L1) displayed in the scrollable display region A1, so as to bring the operation button B31 located at the head of the group G4 (associated with the menu item M4), the name of which is indicated by the menu item M4, to the uppermost position of the scrollable display region A1.

After scrolling upward the list of items to be set L1 as above, the display controller 101 stops the scrolling action when the operation button B31 marked as "Density" and located at the head of the group G4 has reached the uppermost position of the scrollable display region A1, as shown in FIG. 12B. Here, instead of stopping the scrolling action when the operation button located at the head of the group has reached the uppermost position of the scrollable display region A1, the display controller 101 may stop the scrolling action, for example when all the operation buttons in the group are located at a predetermined central position in the scroll direction of the scrollable display region (in this embodiment, up-down direction), or when the operation button located at the head of the group has reached a predetermined position in the scroll direction of the scrollable display region (in this embodiment, up-down direction).

Figure 13A:
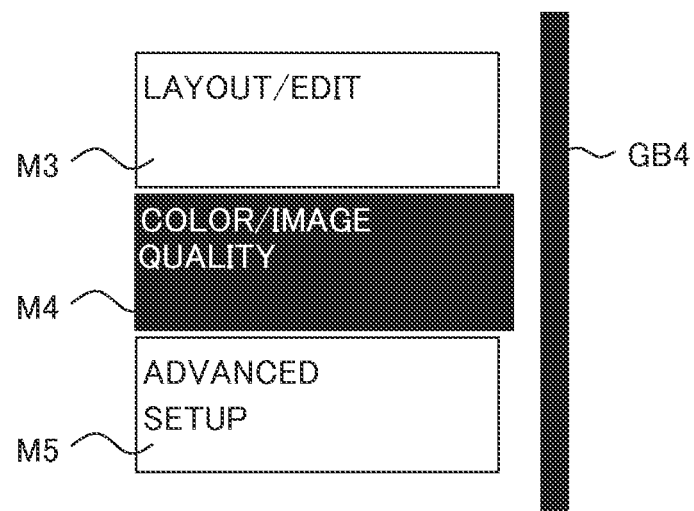
FIG. 13A to FIG. 13C are schematic drawings each showing an example of an animated display of menu items.
Figure 13B:
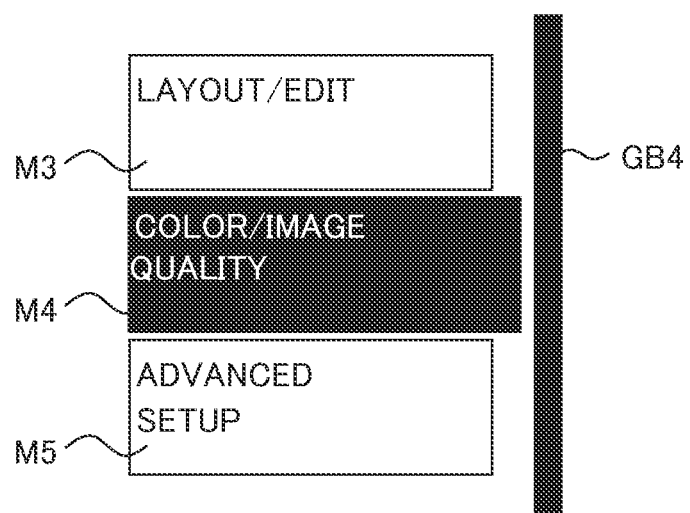
Figure 13C:
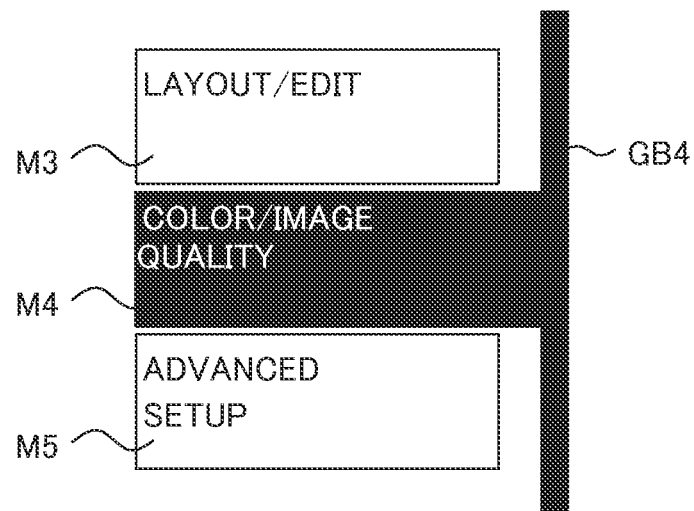

Further, the display controller 101 performs an animated display, to show how the menu item M4 newly displayed in the eye-catching color gradually extends toward the group range bar GB4, thus becoming wider than the other menu items, and is connected to the group range bar GB4, in the form of an animated motion picture. FIG. 13A to 13C illustrate an example of the animated display showing the change of the menu item M4.

As described above, the operation buttons B1 to B53 are listed along the scroll direction in the list of items to be set L1, and a space is provided between the groups. The display controller 101 does not display the group range bars GB1 to GB5 at the position corresponding to the space between the groups. In other words, while the display controller 101 displays, when one of the menu items is selected, the group range bar corresponding to the group associated with the selected group in the eye-catching color, the space portion is constantly displayed in the faint color. Therefore, when the group range bar is displayed in the eye-catching color, the user can clearly recognize the head and the tail of the range of the items to be set included in the same group.

According to the second embodiment, when the user selects one of the menu items, the display controller 101 displays the selected menu item in the eye-catching color, and also displays the group range bar corresponding to the group associated with the selected menu item, in the eye-catching color. Accordingly, the user can clearly recognize which of the items to be set displayed in the scrollable display region A1 corresponds to the menu item selected by the user. Such an arrangement further facilitates the user to recognize for which group the item to be set displayed in the screen is to be used.

When scrolling the image of the list of items to be set L1 displayed in the scrollable display region A1, the display controller 101 displays the group range bar, extending over the range corresponding to the items to be set included in the same group as the item to be set displayed at the uppermost position of the scrollable display region A1, in the eye-catching color, while displaying the other group range bars in the faint color.

In addition, when the display controller 101 displays the group range bar, extending over the range corresponding to the items to be set included in the same group as the item to be set displayed at the uppermost position of the scrollable display region A1, in the eye-catching color, the display controller 101 also displays the menu item, associated with the group that includes the item to be set displayed at the uppermost position of the scrollable display region A1, in the eye-catching color, while displaying the other menu items in the faint color.

Further, the display controller 101 performs the animated display showing the menu item displayed in the eye-catching color extending toward the group range bar, thus being connected thereto. As result, the user can more easily recognize the group associated with the selected menu item.

The disclosure may be modified in various manners, without limitation to the configuration according to the first and second embodiments. Although the display apparatus 20 is incorporated in the image forming apparatus 1 which at least includes the image forming device 12, in the first and second embodiments, the display apparatus 20 according to the disclosure is broadly applicable to other electronic apparatuses, such as medical equipment, a car navigation system, a ticket vender, and so forth.

The configurations and processings described with reference to FIG. 1 to FIG. 13C are merely exemplary, and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. A display apparatus comprising:
a touch panel;
a display device; and
a control device including a processor, and configured to act as a display controller that controls a displaying operation of the display device, when the processor executes a control program, wherein the display controller causes the display device to:
display an operation screen including a scrollable display region for displaying a list of setting items, in which the setting items are classified into groups and listed along a scroll direction, and a menu display region for displaying menu items each indicating a name of a group with respect to each of the groups;
display a first menu item indicating a name of a first group that includes a first setting item displayed at an uppermost position of the scrollable display region, in a first display style visually different from other menu items;
scroll, when the touch panel receives a scroll instruction made on the scrollable display region, the list of setting items according to the scroll instruction;
switch, when changing the setting item displayed at the uppermost position from the first setting item to a second setting item by scrolling of the list of setting items based on the scroll instruction and when the group corresponding to the setting item displayed at the uppermost position is shifted from the first group to a second group that includes the second setting item, the menu item to be displayed in the first display style from the first menu item to a second menu item indicating a name of the second group; and
maintain, even when changing the setting item displayed at the uppermost position from the first setting item to the second setting item by scrolling of the list of setting items based on the scroll instruction, when the group corresponding to the setting item displayed at the uppermost position is not shifted from the first group to the second group, the menu item to be displayed in the first display style in the first menu item,
wherein the display controller displays group range bars each indicating a range of a corresponding group, in the scrollable display region side by side with the list of setting items, with respect to each of the groups, and
displays a first group range bar over a range corresponding to the setting items included in the first group, the name of which is indicated by the first menu item displayed in the first display style, in a second display style visually different from the group range bar displayed at a different position,
wherein the display controller further displays the first menu item in a first color as a predetermined eye-catching color, and displays the other menu items in a second color weaker than the first color, and
wherein the display controller displays, when displaying the first menu item in the first color, the group range bar in the same color as the first color at a position between the menu items and the list of setting items, in the scrollable display region, and
displays the first menu item displayed in the first display style in a size larger than the other menu items, by extending the first menu item so as to reach the first group range bar.

2. The display apparatus according to claim 1, wherein the display controller displays, by animation, the first menu item displayed in the first display style, gradually extending toward the first group range bar, until being connected to the first group range bar.

* * * * *